(12) United States Patent
Musick et al.

(10) Patent No.: US 9,416,277 B2
(45) Date of Patent: Aug. 16, 2016

(54) PROCESS FOR CONTROLLING PARTICLE SIZE AND ADDITIVE COVERAGE IN THE PREPARATION OF TITANIUM DIOXIDE

(75) Inventors: Charles David Musick, Waverly, TN (US); Robert A Johns, Kennett Square, PA (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 610 days.

(21) Appl. No.: 13/978,279

(22) PCT Filed: Jan. 6, 2012

(86) PCT No.: PCT/US2012/020488
§ 371 (c)(1),
(2), (4) Date: Jul. 3, 2013

(87) PCT Pub. No.: WO2012/096843
PCT Pub. Date: Jul. 19, 2012

(65) Prior Publication Data
US 2013/0284067 A1    Oct. 31, 2013

Related U.S. Application Data

(60) Provisional application No. 61/431,142, filed on Jan. 10, 2011.

(51) Int. Cl.
C08K 3/22     (2006.01)
C09C 3/06     (2006.01)
C01G 23/07    (2006.01)
C09C 1/36     (2006.01)

(52) U.S. Cl.
CPC ............ *C09C 3/063* (2013.01); *C01G 23/07* (2013.01); *C08K 3/22* (2013.01); *C09C 1/3653* (2013.01); *C01P 2002/52* (2013.01); *C01P 2004/84* (2013.01)

(58) Field of Classification Search
None
See application file for complete search history.

(56) References Cited

U.S. PATENT DOCUMENTS

| 2,488,440 | A |   | 11/1949 | Schaumann |           |
|-----------|---|---|---------|-----------|-----------|
| 2,721,626 | A |   | 10/1955 | Rick      |           |
| 5,203,916 | A |   | 4/1993  | Green et al. |        |
| 5,562,764 | A |   | 10/1996 | Gonzalez  |           |
| 5,922,120 | A | * | 7/1999  | Subramanian | B82Y 30/00 |
|           |   |   |         |           | 106/437   |
| 2004/0258610 | A1 |   | 12/2004 | Subramanian et al. | |
| 2007/0172414 | A1 | * | 7/2007  | Subramanian | C01G 23/07 |
|           |   |   |         |           | 423/613   |
| 2007/0245924 | A1 |   | 10/2007 | Hofmann et al. | |
| 2009/0148605 | A1 | * | 6/2009  | Akhtar    | B82Y 30/00 |
|           |   |   |         |           | 427/299   |

FOREIGN PATENT DOCUMENTS

| CN | 1077468    | 10/1993 |
| CN | 1430653    | 7/2003  |
| WO | 9636441    | 11/1996 |
| WO | 0179358    | 10/2001 |
| WO | 2007/050682 | 5/2007 |

OTHER PUBLICATIONS

International Search Report, PCT/US2012/020488, Dated Mar. 29, 2013.
P.L. Gai, Direct Probing of Gas Molecule-Solid Catalyst Interactions on the Atomic Scale, Advanced Materials, 1998, V10, pp. 1259-1263.

* cited by examiner

*Primary Examiner* — Shamim Ahmed
*Assistant Examiner* — Bradford Gates

(57) ABSTRACT

The present disclosure relates to a vapor phase process for producing a substantially anatase-free titanium dioxide pigment comprising: reacting a vaporous titanium dioxide precursor and an oxygen containing gas in a reactor; and introducing a mixture of liquid titanium dioxide precursor and a liquid or finely divided solid compound comprising a element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, into the reactor at a point downstream of the addition of the vaporous titanium dioxide precursor, and the oxygen containing gas, and at a process temperature of about 1200° C. to about 1600° C. to produce titanium dioxide particles that are coated by the oxide formed from the element.

15 Claims, No Drawings

PROCESS FOR CONTROLLING PARTICLE SIZE AND ADDITIVE COVERAGE IN THE PREPARATION OF TITANIUM DIOXIDE

BACKGROUND OF THE DISCLOSURE

The present disclosure relates to the chloride process for the production of titanium dioxide pigment. This disclosure provides a route for depositing surface treatments on the titanium dioxide particles without wet treatment.

Typically titanium dioxide particles may be produced by either the chloride or the sulfate process. In the chloride process, typically titanium dioxide is prepared by reacting titanium tetrachloride ($TiCl_4$) with oxygen. This reaction occurs at temperatures of about 1200° C. to about 1600° C. The pigment properties of the so prepared titanium dioxide particles may then be modified to optimize the pigment properties of dispersion, optical spacing or durability by processing in one or more wet treatment operations to deposit metal oxides on the surface of the pigment. Deposits of aluminum oxide or combinations of aluminum oxide and silicon dioxide, or aluminum oxide and zirconium oxide, used alone or in combination with other oxides, are typical constituents of commercial titanium dioxide pigment. Such surface treatments are deposited through precipitation of the desired metal oxide in a wet chemical reaction. Thus, the base pigment, that is, the titanium dioxide particles produced at the exit point of the oxidizer in the chloride process or after calcination in the sulfate process, must be washed and processed through one or more wet treatment steps. Wet treatment is then followed by washing, drying and grinding to produce a product suitable for use in for example, exterior coatings and plastics or paper products. The silicon dioxide added via wet chemistry requires additional grinding energy to obtain the desired finished product properties.

A process is needed that effectively coats titanium dioxide particles with metal oxides to produce durable, non-yellowing substantially anatase-free titanium dioxide particles, having smaller particle size, while not requiring additional operating or equipment costs.

SUMMARY OF THE DISCLOSURE

The present disclosure provides a vapor phase process for producing a substantially anatase-free titanium dioxide comprising:

(a) reacting a vaporous titanium dioxide precursor and an oxygen containing gas in a reactor; and (b) introducing a mixture of liquid titanium dioxide precursor and a liquid or finely divided solid compound comprising an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, into the reactor at a point downstream of the addition of the vaporous titanium dioxide precursor, and the oxygen containing gas, and at a process temperature of about 1200° C. to about 1600° C. to produce titanium dioxide particles that are coated by the oxide formed from the element, and have a smaller particle size distribution.

By 'coated' we mean oxide formed from the element is located on the surface of the titanium dioxide particles. Typically, the coating is substantially complete, more typically the titanium dioxide is encapsulated in the coating. Typically, the coating of oxide formed from the element is pyrogenically deposited.

By 'finely divided solid' we mean a solid with an average particle size less than 50 microns and can be slurried in liquid $TiCl_4$.

By 'substantially anatase-free titanium dioxide' we mean titanium dioxide with less than about 0.7% anatase formation, more typically less than about 0.5% of anatase formation, and most typically less than about 0.2% of anatase formation.

The titanium dioxide precursor may be titanium tetrahalide or titanium alkoxides. More typically the titanium tetrahalide is titanium tetrachloride. The oxygen containing gas may be oxygen or aft or oxygen enriched air.

It is also typical that the liquid or finely divided solid compound comprising an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, typically Ge, Nb, Li, Be, B, Mg, Al, P, K, Zn, Zr, Rb, Mo, Cs, and W, more typically Ge, Nb, B, P, Zn, W, and Zr, is introduced in an amount sufficient to provide an oxide of the element to be added content of about at least 0.1% and more typically at least 0.5% by weight. Optionally aluminum halide, typically aluminum trichloride, can be added to the vaporous titanium dioxide precursor in an amount sufficient to provide an aluminum oxide content of finished pigment of at least about 1% by weight, Optionally silicon halide, more typically silicon tetrachloride, may be added downstream of the additions made in step (b) in an amount sufficient to provide a silicon dioxide content of about at least about 1.0% by weight, based on the total weight of the pigment.

The present disclosure also provides a durable titanium dioxide pigment coated by an oxide of an element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb wherein at least 75% of the pigment particles are completely covered by a layer of an amorphous oxide of the element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, the pigment produced by:

(a) reacting a vaporous titanium dioxide precursor and an oxygen containing gas in a reactor; and (b) introducing a mixture of liquid titanium dioxide precursor and a liquid or finely divided solid compound comprising an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ii, Pt, Au, Hg, Tl, and Pb, into the reactor at a point downstream of the addition of the vaporous titanium dioxide precursor, and the oxygen containing gas, and at a process temperature of about 1200° C. to about 1600° C. Typically the compound is a salt of the element such as a halide, e.g. a chloride, sulfate, oxychloride, carbonate, or nitrate, more typically a halide, and still more typically a chloride.

DETAILED DESCRIPTION OF THE DISCLOSURE

The production of titanium dioxide, $TiO_2$, by vapor phase oxidation of titanium tetrachloride, $TiCl_4$, is well known and described in U.S. Pat. Nos. 2,488,439 and 2,559,638, the teachings of which are incorporated herein by reference. The present disclosure relates to improvements in the aforementioned processes.

The anatase-free titanium dioxide formed is durable meaning a pigment particularly suitable for exterior architectural coatings and automotive refinish or color coat/clear coat OEM finishes. These pigments also have application in the paper and polymer composites industries The composition of the oxide treatment deposited by the process of the present disclosure may be an amorphous oxide or may be a mixture of amorphous aluminum oxide and amorphous oxides of an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb. The thickness of the treatment layer deposited in the present disclosure is typically not more than about 5 nm, more typically about 0.25 to about 5 nm, and most typically about 0.5 to about 2.5 nm. The pigment is typically more than 99% rutile. The supplied oxides are present in the amount of at least about 0.1%, more typically about 0.24% to about 5%, and still more typically about 0.5% to about 3%, based on the total weight of the treated titanium dioxide particle.

The product of the present disclosure is characterized by the fact that at least 75% of the particles are covered, by a layer of surface treatment. The surface treatment may be present as a thin and uniform layer, or it may be present dispersed along the surface of the TiO2 particle surface, or it may be present as an amorphous mixture of aluminum oxide and the metal oxide. A key is that the metal oxide is located on the surface of the titanium dioxide particles.

In comparison to the present disclosure, wet treatment processes deposit oxides on to the surface of the pigment particle by precipitation. Wet treatment processes typically produce debris, crystalline aluminum oxide, and irregular particle surfaces. Crystalline oxides typical of wet treatments are not found in the product of the present disclosure.

Elimination of wet treatment offers an advantage in the overall titanium dioxide manufacturing process in reducing processing steps and thereby cost of manufacture. New treatment compositions offer the potential to produce pigments having improved processing characteristics and properties.

In contrast to pigments produced by wet treatment processes, the pigment of the present disclosure is free of debris. This lack of debris may contribute to improved dispersion and improved performance in coatings and plastics. Since the oxide is deposited pyrogenically, the absence of moisture on the surface that is present with the wet treatment process is beneficial to thin film plastics applications.

Oxides of this disclosure may be deposited using the present process, and the pigment of the present disclosure may be treated with organic treatments as is known by one skilled in this art. Although pigments may be produced by the process of the present disclosure when at least 75% of the particles are coated with the metal oxide, it is more typical that at least 85% of particles are coated with the metal oxide, and about 95% or more is even more typical.

In the present process, a titanium dioxide precursor, such as titanium halide or titanium alkoxide, is preheated to a temperature of from about 300 to 650° C. and optionally mixed with an aluminum halide, such as aluminum trichloride, forming a mix which is fed into a pre-heated stream of oxygen containing gas, more typically oxygen. Water tends to have a rutile promoting effect. It is typical that the reactants be hydrous. For example the oxygen containing gas may comprise hydrogen in the form of water and can range from about 0.01 to about 0.3 weight % of hydrogen, more typically about 0.02 to about 0.2% weight % of hydrogen, based on the $TiO_2$ produced. Optionally, the oxygen containing gas may also comprise a vaporized alkali metal salt to act as a nucleant. Some suitable alkali metal salts include inorganic potassium salts such as KCl, organic potassium salts, and cesium salts such as CsCl.

Some typical titanium halides include titanium tetrachloride or titanium trichloride. Some typical titanium alkoxides include titanium tetraisopropoxide, titanium tetraethoxide and titanium tetrabutoxide. This mix may contain other metal compounds, including low levels of silicon tetrachloride (<0.2% $SiO_2$). Some examples of other metal compounds used in the chloride pigment manufacture may include compounds of boron, phosphorous, zirconium, tungsten and others. The introduction of phosphorous compounds into the oxidizer is generally positioned to control corrosion and may be at some point down stream of the point where the titanium dioxide precursor and aluminum halide are introduced into the reactor. In addition to the aluminum halide, water vapor may be used in the titanium reaction The typical location for the addition of the aluminum halide is in a mixture with the titanium dioxide precursor.

In the process of the present disclosure, oxygen containing gas, typically oxygen, air or oxygen-enriched air is present as an initial reactant. Although it is typical to run the present process with the oxygen in excess of the amount required to oxidize the chloride mix, the process may be operated with the concentration equal to or less than the stoichiometric amount. The oxygen containing gas comprises oxygen, air or oxygen-enriched air.

The addition of the liquid mixture of a liquid or finely divided solid compound comprising an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and B, typically Ge, Nb, Li, Be, B, Mg, Al, P, K, Zn, Zr, Rb, Mo, Cs, and W, more typically Ge, B, P, Zn, W, and Zr, and the titanium dioxide precursor that may be similar to that discussed earlier may be made at a point in the reactor where the process temperature is 1200° C. to 1600° C., more typically about 1400° C. to about 1600° C., and still more typically about 1500° C. to about 1600° C. By 'liquid mixture' we mean both the liquid or finely divided solid compound and the titanium dioxide precursor are in, or suspended in, the liquid phase. The mixture is added at a ratio of TiCl4:compound of about 1:1 to about 50:1, more typically a ratio of about 2:1 to about 30:1, and most typically about 5:1 to about 10:1.

Suitable the liquid or finely divided solid compounds comprising an element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, Pb, and B, typically Ge, Nb, Li, Be, B, Mg, Al, P, K, Sn, Zn, Zr, Mo, Cs, and W, more typically Ge, Nb, B, P, Zn, W, and Zr, include liquid compounds typically comprising boron trichloride, phosphorous trichloride, or stannic tetrachloride and finely divided solid compounds typically comprising zirconium tetrachloride, zinc chloride, lithium chloride, cesium chloride, potassium chloride, magnesium chloride, aluminum trichloride, rubidium chloride, molybdenum pentachloride, stannous chloride, tungsten pentachloride, or tungsten hexachloride.

Often, the point or points of addition will not exceed the downstream distance travelled by the reactants or reaction products by about 0.002 to about 2 seconds, more typically 0.005 to about 0.3 seconds, after the initial contact of the reactants. Alternately, the point of the liquid compound addition may be determined as the minimum length of about 3 to about 6 diameters of the flue after the $TiCl_4$ and oxygen are initially contacted. At these points of addition typically at least 90% of the titanium tetrachloride, more typically 95% of the titanium tetrachloride has been converted to titanium dioxide. That is, the point where not more than 10% of the initial titanium tetrachloride charge remains unreacted.

The advantage of mixing the liquid or finely divided solid compound and liquid titanium dioxide precursor together is believed to be the generation of additional turbulence at the location where the liquid titanium dioxide precursor is added. This additional turbulence is expected to enhance the mixing of the liquid or finely divided solid compound throughout the reactor discharge prior to conversion to its oxide which provides better coverage of the $TiO_2$ particles. By using the liquid titanium dioxide precursor instead of another liquid, there is no added inert load to the downstream equipment as the liquid titanium dioxide precursor also generates $TiO_2$.

Some reactors useful in this process for the preparation of the titanium dioxide particles include aersol flame reactors and plasma flame reactors.

Process temperatures range from about 1200° C. to about 1600° C., more typically about 1400° C. to about 1600° C., and still more typically about 1500° C. to about 1600° C. Pressures range from about 5 to about 100 psig, more typically about 15 to about 70 psig. It is believed that higher temperatures and pressures also assist in achieving rutile formation.

The reaction product containing a suspension of titanium dioxide particles in a mixture of chlorine and residual gases is carried from the reaction zone at temperatures considerably in excess of 1200° C. and is then subjected to fast cooling in the flue. The cooling can be accomplished by any conventional means known to one skilled in the art. In one embodiment, scouring particles or scrubs can be typically added downstream or at the addition of the liquid compound to minimize the buildup of titanium dioxide particles on the interior of the flue during cooling. This is described in greater detail in U.S. Pat. No. 2,721,626, the teachings of which are incorporated herein by reference.

The titanium dioxide particles recovered from the cooled reaction products may undergo conventional separation techniques. Some such techniques include cyclonic or electrostatic separation, filtration through porous media, etc. The recovered titanium dioxide particles may then be subjected to further surface treatment, milling, grinding or disintegration treatment to obtain the desired level of agglomeration.

The titanium dioxide particles are tested for Carbon Black Undertone (CBU), a measure of particle size. It is believed that the higher the CBU, the smaller the particles. A typical CBU for $TiO_2$ used in paint is about 10. CBU is determined by mulling together a suitable liquid, such as light colored oil and standard weights of the sample and a standard carbon black. The mixture is spread with a standard mixture on a panel and the relative blueness of the gray mixtures was observed. Fine particles give a bluer undertone or higher CBU. CBU values may be determined by methods described in U.S. Pat. No. 2,488,440, the teachings of which are incorporated herein by reference, with exception that a rating of 10 versus 100 is typically used.

Typically, the substantially anatase-free titanium dioxide pigment has a carbon black undertone (CBU) of about 8 to about 25, more typically 9 to about 20, and most typically about 10 to about 18. The substantially anatase-free titanium dioxide pigment has a coarse tail particle size of about 5% to about 50%>0.6 um, more typically 10% to about 40%>0.6 um, and most typically about 10% to about 25%>0.6 um for the production of a high gloss grade.

Particle size distribution of the pigment particles is measured by sedimentation analysis, with a Sedigraph® (Micromeritics Instrument Corp., Norcross, Ga.) after dispersion in aqueous suspension by fixed level sonication. The particle size measurement of the oxidation base and the %>0.6 micron fraction will indicate the potential for peak gloss in the finished product, a value that cannot be exceeded while applying any reasonable energy level. In addition, less grinding energy is required for improving the quality of the oxidation base.

EXAMPLES

Test Procedures

High Resolution Electron Microscopy Procedures:

A combination of high resolution transmission EM (HREM) with atomic resolution and high resolution low voltage scanning EM (LVSEM) was used to determine the microstructure, morphology, treatment layer thickness, uniformity and chemical composition.

Microstructure and high precision chemical compositional analyses on a (sub)nanometer scale were carried out by HREM and the associated electron stimulated energy dispersive X-ray compositional spectroscopy (EDX), respectively. A Philips CM200 field emission gun HREM/STEM, Philips CN/120 HREM and a modified Philips CM30 environmental-HREM instruments were used in the investigations, with an accelerating voltage of 200 kV (ref: P. L. Gai, DuPont: published in Advanced Materials, Vol. 10, p. 1259, 1998), All the EMs were equipped with X-ray spectrometers to analyze chemical composition.

The extent of treatment and treatment layer coverage observations were made on all sides (including top and bottom surfaces) of the particles using standard sample tilting methods. For HREM, the pigment crystals were oriented so that the desired crystal axes (e.g. <010>) were exactly parallel to the electron beam. Primary magnifications were 100,000 to 750,000.

A minimum sampling of 1000 particles having variable particle size and dimensionality was studied to represent an accurate measure of the fraction of particles treated and the extent of the treatment surface coverage. HREM at atomic resolution was used to determine monolayer coatings as well as nanometers-scale coatings. Observations of irregularity in treatment layers of partially coated and fully coated particles were carried out. Histograms were prepared according to standard statistical methods and were used to determine the fraction of particles where the treatment layer was full and complete at treatment layer thickness.

Comparative Example 1

Zirconium Tetrachloride (ZrCl4) was premixed with titanium tetrachloride and aluminum trichloride and fed to the oxidation reactor. The zirconium tetrachloride was added at an amount sufficient to add 0.5% zirconium oxide to the titanium dioxide pigment. The TiCl₄ temperature was 450° C. and the oxygen temperature was 1530° C. for the test conditions. The production rate was 13 tons/hr. The percent of particles >0.6 microns was found to decrease from 24.5% to 22.3% with the addition of the zirconium tetrachloride. Analysis of the pigment with the zirconium found the zirconium oxide was incorporated throughout the titanium dioxide crystal lattice with no coating on the titanium dioxide particles. The titanium dioxide produced containing the co-oxidized zirconium oxide did not show an improvement in photodurability.

Example 1

Finely divided zirconium tetrachloride is mixed with liquid $TiCl_4$ and fed to the reactor as a finely dispersed liquid at a location 5 feet (1.5 meters) downstream (or about 0.02-0.04 seconds from the point at which the $TiCl_4$, $AlCl_3$ and oxygen are initially contacted) at an amount sufficient to provide a loading of 0.5% by weight $ZrO_2$ based on the total solids formed in the oxidation reaction. The ratio of liquid $TiCl_4$ to $ZrCl_4$ is 25:1 by mass. The $TiCl_4$ temperature is 425° C. and the oxygen temperature is 1540° C. for the test conditions. The mixture of $ZrCl_4$ and $TiCl_4$ are introduced into the reactor at a temperature of 30° C. where $ZrCl_4$ is a finely divided solid and $TiCl_4$ is a liquid. The estimated temperature of the reaction mass at the point of $ZrCl_4$ injection is about 1400° to 1500° C. for the reaction zone at a pressure of about 40 psig. The production rate is 10 tons/hr. It is anticipated that the zirconium oxide generated in the reactor will be present on the surface of over 75% of the titanium dioxide particles. It is further anticipated that the zirconium oxide on the surface will improve the photodurability of the titanium dioxide pigment while maintaining the reduction in the percent of particles >0.6 microns.

What is claimed is:

1. A vapor phase process for producing a substantially anatase-free titanium dioxide pigment comprising:
   (a) reacting a vaporous titanium dioxide precursor and an oxygen containing gas in a reactor; and
   (b) introducing a mixture of liquid titanium dioxide precursor and a liquid or finely divided solid compound comprising a element selected from the group consisting of Li, Be, B, Na, Mg, Al, P, S, K, Ca, Sc, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, into the reactor at a point downstream of the addition of the vaporous titanium dioxide precursor, and the oxygen containing gas, and at a process temperature of about 1200° C. to about 1600° C. to produce titanium dioxide particles that are coated by the oxide formed from the element.

2. The process of claim 1 wherein the element is selected from the group of Ge, Nb, Li, Be, B, Mg, Al, P, K, Zn, Zr, Rb, Mo, Cs, and W.

3. The process of claim 2 wherein the element is selected from the group of Ge, Nb, B, P, Zn, W, and Zr.

4. The process of claim 1 wherein the titanium dioxide comprises less than about 0.7% anatase.

5. The process of claim 1 wherein the titanium dioxide precursor is titanium tetrachloride, $TiCl_4$.

6. The process of claim 1 wherein the liquid compound comprises boron trichloride, phosphorous trichloride, or stannic tetrachloride.

7. The process of claim 1 wherein the finely divided solid compound comprises zirconium tetrachloride, zinc chloride, lithium chloride, cesium chloride, potassium chloride, magnesium chloride, aluminum trichloride, rubidium chloride, molybdenum pentachloride, stannous chloride, tungsten pentachloride, or tungsten hexachloride.

8. The process of claim 1 wherein the liquid or finely divided solid compound is introduced in an amount sufficient to provide the corresponding oxide content of about at least 0.1% by weight, based on the total weight of the pigment.

9. The process of claim 1 wherein an aluminum halide is added in step (a) along with the vaporous titanium dioxide precursor.

10. The process of claim 1 wherein the liquid titanium dioxide precursor is $TiCl_4$, and where the mixture of liquid or finely divided solid compound and liquid $TiCl_4$ is added at a point in the reactor with a process temperature of about 1400° C. to about 1600° C.

11. The process of claim 1 wherein the liquid titanium dioxide precursor is $TiCl_4$, and where the mixture of liquid or finely divided solid compound and liquid $TiCl_4$ is added about 0.002 to about 2 seconds after the addition of the vaporous titanium dioxide precursor and the oxygen containing gas.

12. The process of claim 1 wherein the liquid titanium dioxide precursor is $TiCl_4$, and where the mixture of liquid or finely divided solid compound and liquid $TiCl_4$ is added at the point wherein oxidation of the vaporous titanium dioxide precursor is at least about 90% complete.

13. The process of claim 1 wherein an additional compound is mixed with the liquid or finely divided solid compound and liquid titanium dioxide precursor.

14. The process of claim 13 wherein the additional compound comprises at least one halide of boron, phosphorous, zirconium, tungsten, aluminum, zinc, sodium, calcium, or magnesium.

15. A durable titanium dioxide pigment coated by a metal oxide wherein at least 75% of the pigment particles are covered by a layer of amorphous metal oxide, the pigment produced by:
   (a) reacting a vaporous titanium dioxide precursor and an oxygen containing gas in a reactor; and
   (b) introducing a mixture of liquid titanium dioxide precursor and a liquid or finely divided solid compound comprising a element selected from the group consisting of Li, Be, B, Na, Mg, Al, P, S, K, Ca, Sc, Ti, V, Cr, Mn, Fe, Co, Ni, Cu, Zn, Ga, Ge, As, Se, Rb, Sr, Y, Zr, Nb, Mo, Ru, Rh, Pd, Ag, Cd, In, Sn, Sb, Te, Cs, Ba, La, Ce, Pr, Nd, Sm, Eu, Gd, Tb, Dy, Ho, Er, Tm, Yb, Lu, Hf, Ta, W, Re, Os, Ir, Pt, Au, Hg, Tl, and Pb, into the reactor at a point downstream of the addition of the vaporous titanium dioxide precursor, and the oxygen containing gas, and at a process temperature of about 1200° C. to about 1600° C. to produce titanium dioxide particles coated by the oxide formed from the element.

* * * * *